United States Patent
Yu et al.

(10) Patent No.: US 9,907,024 B2
(45) Date of Patent: Feb. 27, 2018

(54) WIRELESS COMMUNICATION DEVICE AND CONTROL METHOD THEREOF

(71) Applicant: HTC Corporation, Taoyuan (TW)

(72) Inventors: Chih-Chuan Yu, Taoyuan (TW); Chun-Hao Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/201,505

(22) Filed: Jul. 4, 2016

(65) Prior Publication Data

US 2017/0086136 A1    Mar. 23, 2017

Related U.S. Application Data

(60) Provisional application No. 62/222,226, filed on Sep. 23, 2015.

(51) Int. Cl.
*H04M 3/00* (2006.01)
*H04W 52/02* (2009.01)
(Continued)

(52) U.S. Cl.
CPC .......... *H04W 52/028* (2013.01); *G06F 1/324* (2013.01); *G06F 1/3293* (2013.01); *H04B 1/707* (2013.01);
(Continued)

(58) Field of Classification Search
None
See application file for complete search history.

(56) References Cited

U.S. PATENT DOCUMENTS

| 8,525,869 B2* | 9/2013 | Kim | H04N 7/142 348/14.08 |
| 2008/0019294 A1* | 1/2008 | Inoue | H04L 12/18 370/310 |

(Continued)

FOREIGN PATENT DOCUMENTS

WO    2007101182 A2    9/2007

OTHER PUBLICATIONS

Corresponding extended European search report dated Feb. 2, 2017.
Corresponding Taiwanese office action dated Dec. 26, 2017.

*Primary Examiner* — Suhail Khan
(74) *Attorney, Agent, or Firm* — CKC & Partners Co., Ltd.

(57) ABSTRACT

A wireless communication device includes a transceiver and processing circuitry. The transceiver is configured to establish a telecommunication connection to a network server. The processing circuitry is coupled to the transceiver. The processing circuitry is configured to monitor application programs executed by the processing circuitry. One of the application programs is executed as a foreground application. The processing circuitry is further configured to compare connection parameters of the telecommunication connection established by the transceiver with a connection standard. In response to the foreground application currently communicating with the network server through the telecommunication connection and the connection parameters being lower than the connection standard, the processing circuitry is further configured to limit performance of the processing circuitry, or change a mobile network protocol utilized the transceiver to establish the telecommunication connection.

12 Claims, 5 Drawing Sheets

(51) Int. Cl.

| | | |
|---|---|---|
| *H04W 4/00* | (2018.01) | |
| *H04J 11/00* | (2006.01) | |
| *H04B 1/707* | (2011.01) | |
| *H04W 52/24* | (2009.01) | |
| *G06F 1/32* | (2006.01) | |
| *H04W 88/02* | (2009.01) | |

(52) U.S. Cl.
  CPC .............. *H04J 11/00* (2013.01); *H04W 4/003* (2013.01); *H04W 52/0245* (2013.01); *H04W 52/0287* (2013.01); *H04W 52/243* (2013.01); *H04W 52/245* (2013.01); *H04M 2215/2026* (2013.01); *H04W 88/02* (2013.01); *Y02B 60/50* (2013.01)

(56) References Cited

U.S. PATENT DOCUMENTS

| | | | |
|---|---|---|---|
| 2008/0046542 A1 | 2/2008 | Sano | |
| 2008/0057894 A1* | 3/2008 | Aleksic | H02J 9/002 455/187.1 |
| 2009/0005044 A1 | 1/2009 | Payyappilly et al. | |
| 2012/0201182 A1 | 8/2012 | Kwon et al. | |
| 2014/0066052 A1* | 3/2014 | Chang | H04L 43/08 455/423 |

* cited by examiner

WIRELESS COMMUNICATION DEVICE AND CONTROL METHOD THEREOF

CROSS-REFERENCE TO RELATED APPLICATION

This application claims the priority benefit of U.S. Provisional Application Ser. No. 62/222,226, filed Sep. 23, 2015, the full disclosure of which is incorporated herein by reference.

FIELD OF INVENTION

The disclosure relates to a wireless communication device. More particularly, the disclosure relates to a control method to manage power consumption of a wireless communication device.

BACKGROUND

In order to increase mobility of wireless communication devices, designers are challenged to figure out how to reduce sizes and weights of the wireless communication devices and also provide as many functions as possible. Powerful processors embedded in the wireless communication devices are able to provide various functions and great user experiences. However, it causes heavy power consumption while these processors are operating at full speed.

Because the wireless communication devices are designed in a compact size. A battery capacity on the wireless communication device (e.g., smart phones, tablets, or similar handheld devices) is limited. Also, it is difficult to dissipate heat generated by the operating processors. On the wireless communication devices, it is a critical issue for the designer to balance between the power consumption and the performance.

SUMMARY

Some of this disclosure are to provide a wireless communication device. The wireless communication device includes a transceiver and processing circuitry. The transceiver is configured to establish a telecommunication connection to a network server. The processing circuitry is coupled to the transceiver. The processing circuitry is configured to monitor application programs executed by the processing circuitry. One of the application programs is executed as a foreground application. The processing circuitry is further configured to compare connection parameters of the telecommunication connection established by the transceiver with a connection standard. In some embodiments, in response to the foreground application currently communicating with the network server through the telecommunication connection and the connection parameters being lower than the connection standard, the processing circuitry is further configured to limit performance of the processing circuitry. In some other embodiments, in response to the foreground application currently communicating with the network server and the connection parameters being lower than the connection standard, the processing circuitry is further configured to change a mobile network protocol utilized by the transceiver to establish the telecommunication connection.

Some embodiments of this disclosure are to provide a control method. The control method is suitable for a wireless communication device including a transceiver and processing circuitry. The control method includes following operations. Application programs executed by the processing circuitry are monitored. One of the application programs is executed as a foreground application. Connection parameters of a telecommunication connection established by the transceiver are compared with a connection standard. In some embodiments, in response to the foreground application currently communicating with the network server through the telecommunication connection and the connection parameters being lower than the connection standard, the processing circuitry is further configured to limit performance of the processing circuitry. In some other embodiments, in response to the foreground application currently communicating with the network server and the connection parameters being lower than the connection standard, the processing circuitry is further configured to change a mobile network protocol utilized by the transceiver to establish the telecommunication connection.

Another aspect of the disclosure is to provide a non-transitory computer readable storage medium with a computer program to execute aforesaid control method.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
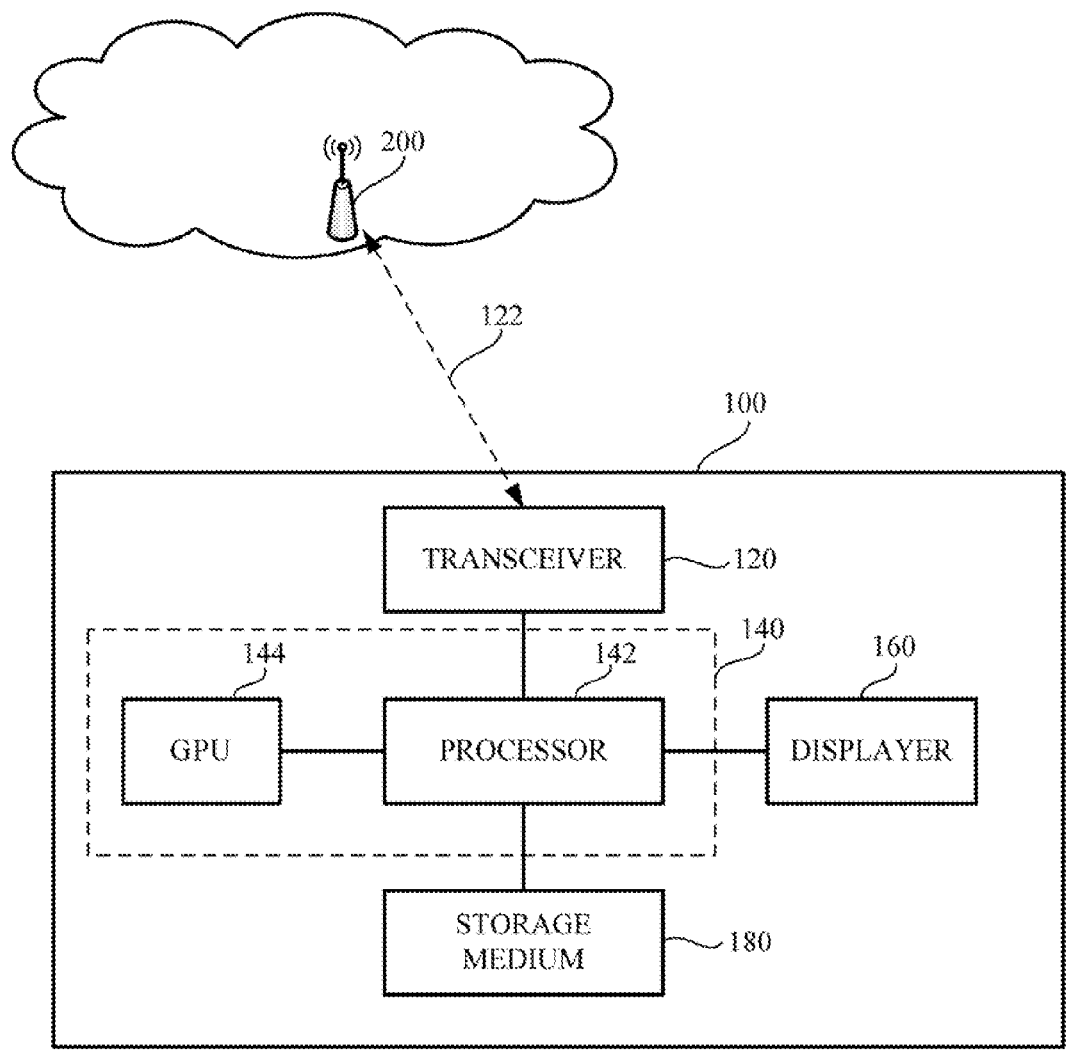
FIG. 1 is a schematic diagram illustrating a wireless communication device according to embodiments of this disclosure.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Reference is made to FIG. 1, which is a schematic diagram illustrating a wireless communication device 100 according to an embodiment of this disclosure. The wireless communication device 100 includes a transceiver 120 and processing circuitry 140. The transceiver 120 is configured to establish a telecommunication connection 122 to a network server 200. In some embodiments, the transceiver 120 includes a mobile network antenna (not shown in figures)

which is able to transmit data to the network server 200 or receive data from the network server 200 based on one or more mobile network protocols. The processing circuitry 140 is coupled with the transceiver 120, and the processing circuitry 140 configured to process general computations and control functions on the wireless communication device 100.

In some embodiments, the transceiver 120 is able to establish the telecommunication connection 122 based on different mobile network protocols selected from $2^{nd}$ generation network protocols (2G), $3^{rd}$ generation network protocols (3G) and $4^{th}$ generation network protocols (4G). The 2G network protocols include, for example, Global System for Mobile Communications (GSM) network protocol. The 3G network protocols include, for example, a Wideband Code Division Multiple Access (WCDMA) network protocol, a Telecommunications System (UMTS) network protocol and/or a Third Generation Partnership Project 2 (3GPP2) network protocol. The 4G mobile network protocols include, for example, a Lone Term Evolution (LTE) network protocol and/or a Worldwide Interoperability for Microwave Access (WiMax) network protocol.

The processing circuitry 140 in some embodiments as illustrated in FIG. 1 includes a processor 142 and a graphics processing unit (GPU) 144. The processor 142 is a general-purpose processor for handling general functions on the wireless communication device 100, such as computation, data accessing, power management, executing application programs, telephony functions and any equivalent functions. The processor 142 is implemented by a Central Processing Unit (CPU) or a System-on-Chip (SoC) circuit disposed in the wireless communication device 100. The GPU 144 is a processing component designed specifically for graphic computation.

Figure 2:
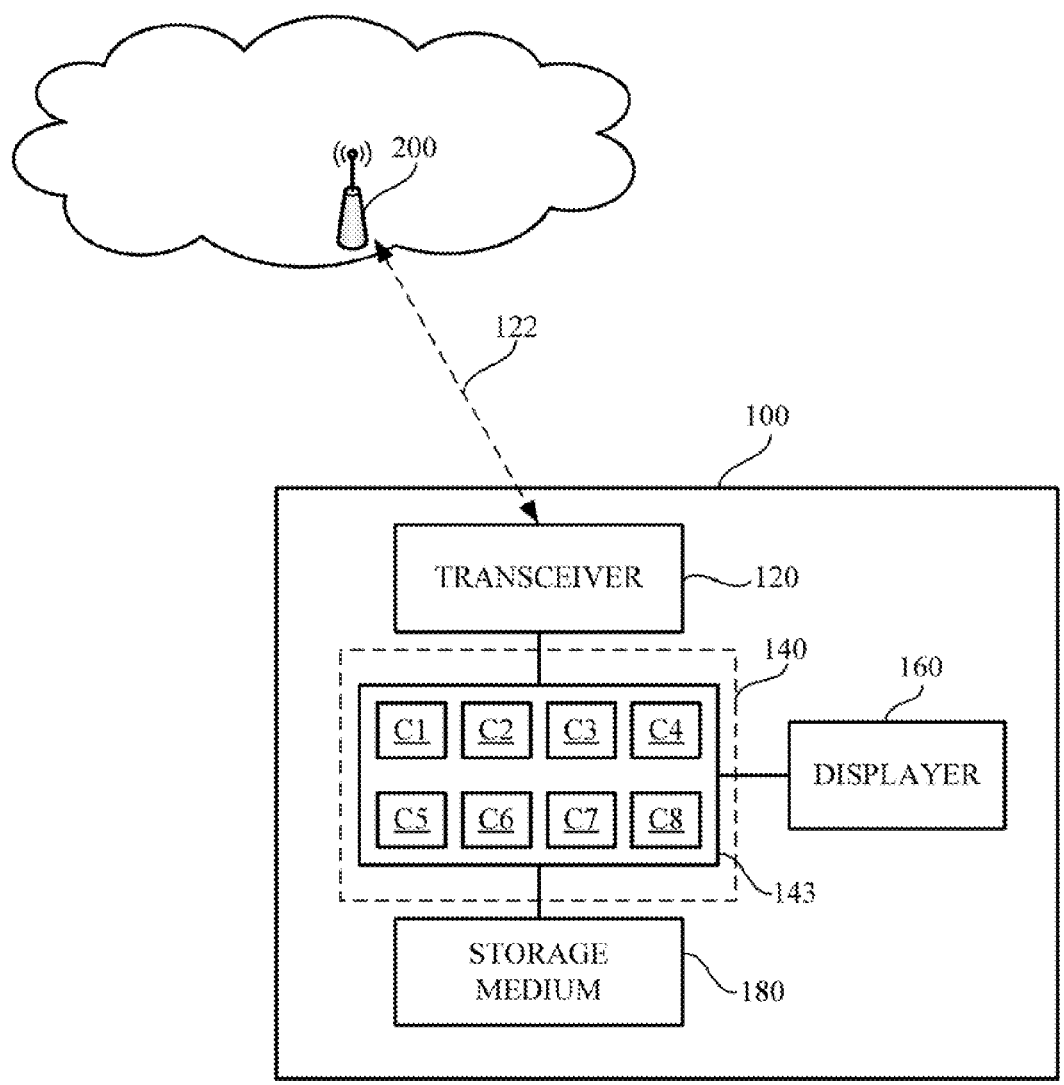
FIG. 2 is a schematic diagram illustrating the wireless communication device in FIG. 1 according to other embodiments.

Reference is also made to FIG. 2 is a schematic diagram illustrating the wireless communication device in FIG. 1 according to other embodiments. With respect to the embodiments of FIG. 1, like elements in FIG. 2 are designated with the same reference numbers for ease of understanding. As illustrated in FIG. 2, the processing circuitry 140 includes a multi-core processor 143. The multi-core processor 143 includes multiple processing cores C1-C8. Each of the processing cores C1-C8 is configured to handle general functions on the wireless communication device 100, such as computation, data accessing, power management, executing application programs, telephony functions and any equivalent functions.

The numbers of the processing cores C1-C8 of the multi-core processor 143 in FIG. 2 are given for illustrative purposes. Various numbers of numbers of the processing cores are able to be implemented in the multi-core processor 143, and are within the contemplated scope of the present disclosure.

The wireless communication device 100 in some embodiments illustrated in FIG. 1 or FIG. 2 further includes a displayer 160 and a storage medium 180. The displayer 160 in some embodiments is a screen disposed on the wireless communication device 100 to show a user interface. The storage medium 180 is configured to store some data and/or application programs of the wireless communication device 100. When some application programs are executed by the processing circuitry 140, information and results related to the application programs are shown on the user interface on the displayer 160.

Figure 3:
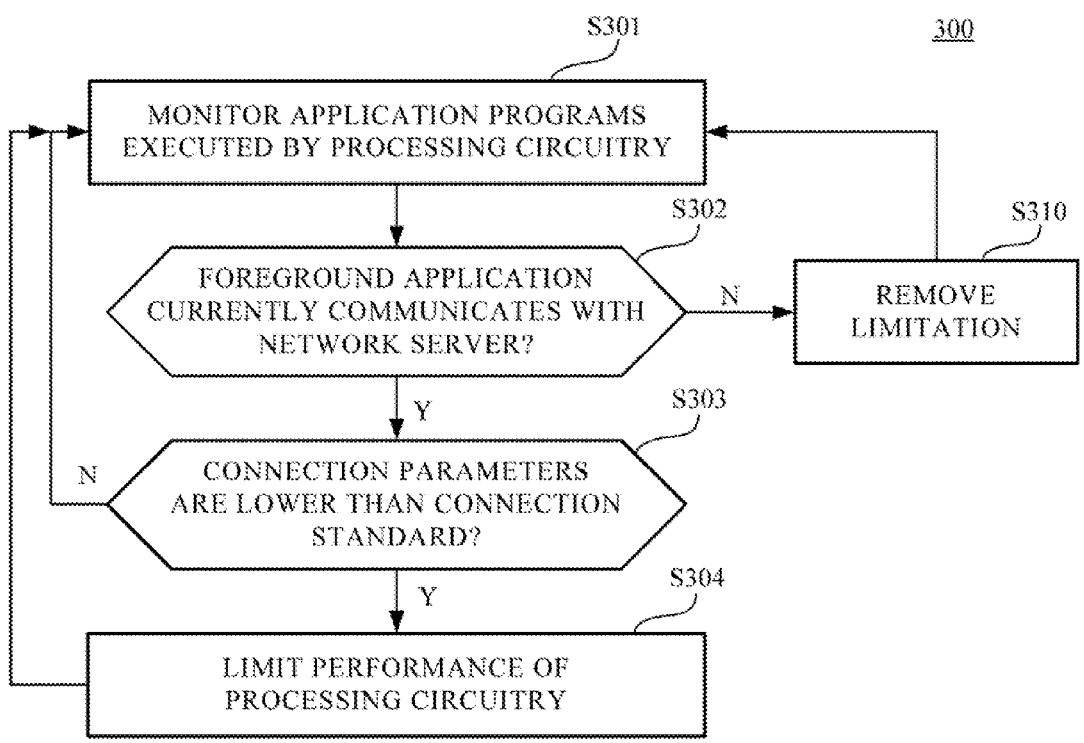
FIG. 3 is a flow diagram illustrating a control method suitable for controlling the wireless communication device in FIG. 1 or FIG. 2.

Reference is made to FIG. 3, which is a flow diagram illustrating a control method 300 suitable for controlling the wireless communication device 100 in FIG. 1 or FIG. 2. As shown in FIG. 3, operation S301 is executed to monitor application programs executed by the processor 142 in FIG. 1 or the multi-core processor 143 in FIG. 2. While the application programs are executed, some of the application programs are executed as foreground applications and also some others of the application programs are as background applications. Background applications are executed by the processing circuitry 140 without directly interacting with users. Results or information of the foreground applications are reflected on the user interface on the displayer 160, such that users can acknowledge these information/results of the foreground applications.

Operation S302 is executed, by the processor 142 in FIG. 1 or the multi-core processor 143 in FIG. 2, to determine whether the foreground application currently communicates with the network server 200 through the telecommunication connection 122 or not. The foreground application is considered as currently communicating with the network server 200 if the foreground application is currently uploading data to the network server 200 or the downloading data from the network server 200 in FIG. 1 or FIG. 2.

In response to the foreground application currently communicating with the network server 200, operation S303 is executed, by the processor 142 in FIG. 1 or the multi-core processor 143 in FIG. 2, to check connection parameters of the telecommunication connection 122 established by the transceiver 120, and to compare the connection parameters of the telecommunication connection 122 with a connection standard. In some embodiments, the connection parameters of the telecommunication connection 122 includes at least one of a type (2G, 3G or 4G) of the mobile network protocol, a signal strength level of the telecommunication connection 122, a Signal to Noise Ratio (SNR) of the telecommunication connection 122 and a Received Signal Strength Indicator (RSSI) of the telecommunication connection 122. The processor 142 in FIG. 1 or the multi-core processor 143 in FIG. 2 obtains the connection parameters of the current telecommunication connection 122 from the transceiver 120. A demonstrational example about the connection standard is listed in Table 1 as follows:

TABLE 1

| | Comparison Results | | | | |
|---|---|---|---|---|---|
| | Lower than Connection Standard | | | Satisfy Connection Standard | |
| | Type of mobile network protocol | | | | |
| | 2G | 3G | 4G | 3G | 4G |
| Signal Strength Level | 0~5 Bars | 0~2 Bars | 0~2 Bars | 3~5 Bars | 3~5 Bars |

As illustrated in Table 1, the connection standard includes a combination of the type of mobile network protocol and the signal strength level of the telecommunication connection 122. In this demonstrational example, when the type of mobile network protocol is 2G, the connection parameters of the current telecommunication connection 122 is determined to be lower than the connection standard. When the type of mobile network protocol is 3G/4G and the signal strength level is ranged from zero bar to two bars, the connection parameters of the current telecommunication connection 122 is determined to be lower than the connection standard. When the type of mobile network protocol is 3G/4G and the signal strength level is ranged from three bars to five bars, the connection parameters of the current telecommunication connection 122 is determined to be higher than the connection standard. Bars indicate a scale of decibels (dB) of the signal strength level of the telecommunication connection 122. When the signal strength level is stronger, there will be more bars. In some embodiments, 5 Bars indicates the signal strength level of −10 dB of the telecommunication connection 122, and 1 Bar indicates the signal strength level of −60 dB of the telecommunication connection 122.

In response to the connection parameters of the telecommunication connection. 122 being lower than the connection standard, operation S304 is executed, by the processor 142 in FIG. 1 or the multi-core processor 143 in FIG. 2, to limit performance of the processing circuitry 140 in FIG. 1 or FIG. 2.

In some embodiments, the performance of the processing circuitry 140 in FIG. 1 is limited by reducing an operational frequency of the processor 142 or the GPU 144. For example, an operational frequency the processor 142 is reduced from 2 GHz to 500 MHz, such that the performance of the processor 142 is limited and also a power consumption of the processor 142 will be reduced.

In some other embodiments, the performance of the processing circuitry 140 in FIG. 1 is limited by turning off the GPU 144. For example, the GPU 144 is turned off and graphic tasks are computed by the processor 142, such that the graphic-computation performance of the processing circuitry 140 is limited and also a power consumption of the processing circuitry 140 will be reduced.

In some other embodiments, the performance of the processing circuitry 140 in FIG. 2 is limited by turning off at least one processing core C1-C8 of the multi-core processor 143. For example, four processing cores C1-C4 is turned off and computation tasks are completed by the processing cores C5-C8, such that the performance of the processing circuitry 140 is limited and also a power consumption of the processing circuitry 140 will be reduced.

In an example, the foreground application is a network browser, and the network browser is manipulated by the user to access video contents on the network server 200, such as database of Youtube website. While the network browser is waiting the response from the network server 200 or downloading the video contents from the network server 200, the user interface on the displayer 160 will remain the same or simply show a waiting notification. If the connection parameters of the telecommunication connection 122 are lower than the connection standard during the waiting/downloading period, the telecommunication connection 122 will be a bottleneck for the foreground application, and the performance of the processing circuitry 140 in FIG. 1 or FIG. 2 is excess during the waiting/downloading period. The processing circuitry 140 will be idle or standby. The user can not notice any difference on the foreground application displayed on the user interface even the processing circuitry 140 is operated at full performance. Based on operation S304, the performance of the processing circuitry 140 is limited in response to the foreground application currently communicating with the network server and the connection parameters being lower than the connection standard.

After the performance of the processing circuitry 140 is limited in operation S304, the method 300 returns to operations S301 and S302. When the downloading of the data is completed, in other words, operation S302 determines that the foreground application does not currently communicate with the network server 200 through telecommunication connection 122, operation S310 is executed, by the processing circuitry 140, to remove limitation to the performance of the processing circuitry 140 in FIG. 1 or FIG. 2. When the connection parameters of the telecommunication connection 122 satisfy the connection standard in operation S303, the method 300 returns to operation S301.

In another example, the foreground application is a Social Network Services (SNS) application, e.g., Facebook, and the network browser is manipulated by the user to refresh social network contents from the network server 200 or upload a new post by the user to the network server 200. While the network browser is waiting the response from the network server 200 or uploading the new post to the network server 200, the user interface on the displayer 160 will remain the same or simply show awaiting notification. If the connection parameters of the telecommunication connection 122 are lower than the connection standard during the waiting/uploading period, the telecommunication connection 122 will be a bottleneck for the foreground application, and the performance of the processing circuitry 140 in FIG. 1 or FIG. 2 is excess during the refreshing/uploading period. Based on operation S304, the performance of the processing circuitry 140 is limited in response to the foreground application currently communicating with the network server and the connection parameters being lower than the connection standard. After the performance of the processing circuitry 140 is limited in operation S304, operation S310 is executed when the uploading of the data is completed or when the connection parameters of the telecommunication connection 122 satisfy the connection standard in operation S303.

The foreground applications in aforesaid discussion include a network browser and a Social Network Services application. In some other embodiments, the foreground applications include equivalent application programs (e.g., instant Messaging applications, gaming applications, system updating application, cloud file system applications) which are associated, with corresponding network server 200 through the telecommunication connection 122.

Figure 4:
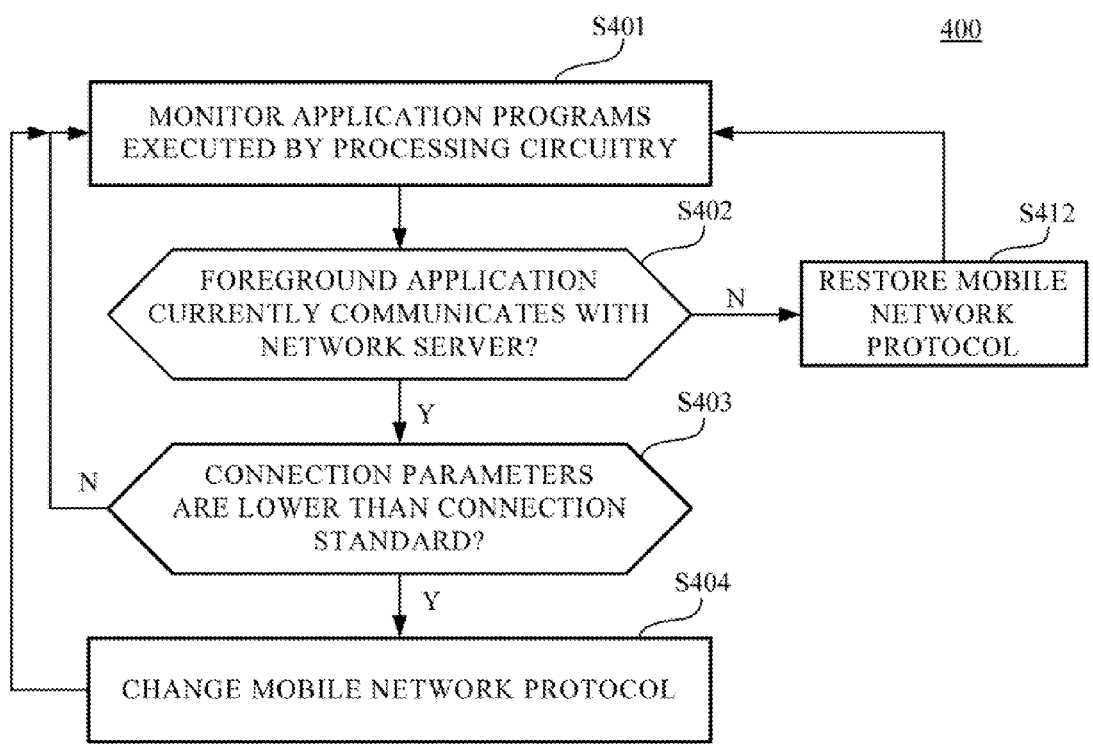
FIG. 4 is another flow diagram illustrating a control method suitable for controlling the wireless communication device in FIG. 1 or FIG. 2.

Reference is made to FIG. 4, which is another flow diagram illustrating a control method 400 suitable for controlling the wireless communication device 100 in FIG. 1 or FIG. 2. As shown in FIG. 4, operation S401 is executed to monitor application programs executed by the processor 142 in FIG. 1 or the multi-core processor 143 in FIG. 2.

Operation S402 is executed, by the processor 142 in FIG. 1 or the multi-core processor 143 in FIG. 2, to determine whether the foreground application currently communicates with the network server 200 through the telecommunication connection 122 or not. The foreground application is considered as currently communicating with the network server 200 if the foreground application is currently uploading data to the network server 200 or the downloading data from the network server 200 in FIG. 1 or FIG. 2.

In response to the foreground application currently communicating with the network server 200, operation S403 is executed, by the processor 142 in FIG. 1 or the multi-core processor 143 in FIG. 2, to check connection parameters of the telecommunication connection 122 established by the transceiver 120, and to compare the connection parameters of the telecommunication connection 122 with a connection standard (referring to Table 1).

In response to the connect parameters of the telecommunication connection being lower than the connection standard, operation S404 is executed, by the processor 142 in FIG. 1 or the multi-core processor 143 in FIG. 2, to change the mobile network protocol utilized by the transceiver 120 from a first mobile network protocol to a second mobile network protocol. The telecommunication connection 122 based on the first mobile network protocol consumes more power than the telecommunication connection based on the second mobile network protocol. The first mobile network protocol is a 4G protocol, such as the Long Term Evolution (LTE) network protocol. The second mobile network protocol is a 2G or 3G protocol, such as Wideband Code Division Multiple Access (WCDMA) network protocol, a Telecommunications System (UMTS) network protocol, a Global System for Mobile Communications (GSM) network protocol, or a Third Generation Partnership Project 2 (3GPP2) network protocol.

For example, in response to the foreground application currently communicates with the network server 200 through the telecommunication connection 122 and also the connection parameters of the telecommunication connection 122 being lower than the connection standard, the mobile network protocol is changed from 4G protocol to 3G/2G protocol. A transmission speed of the mobile network is not only affected by the protocol (2G, 3G or 4G) and also affected by a signal strength level and/or a signal quality of the telecommunication connection 122. When the signal strength is weak or the signal quality is poor, a transmission speed over the 4G-based telecommunication connection 122 will not necessarily be faster than a transmission speed over the 2G or 3G-based telecommunication connection 122. In general, the telecommunication connection 122 based on 4G protocol causes heavier power consumption on the transceiver 120 than another telecommunication connection 122 based on 2G/3G protocol. Especially when the signal strength is weak or the signal quality is poor, an antenna power of the transceiver 120 will be boosted to compensate the signal weakness, and it will further enlarge the gap between power consumptions over 4G and over 2G/3G.

It is understood that, when the signal strength is weak and/or the signal quality is poor, there is no obvious difference between the transmission speed over the 4G-based telecommunication connection 122 and the transmission speed over the 2G or 3G-based telecommunication connection 122. However, the 4G-based telecommunication connection 122 will still consume more power than the 2G or 3G-based telecommunication connection 122. Therefore, when the connection parameters of 4G-based telecommunication connection 122 are lower than the connection standard (e.g., the Signal Strength Level is lower than 2 Bars), the transceiver 120 is triggered to establish the telecommunication connection 122 based 2G/3G protocol. In this case, the power consumption of the transceiver 120 will be reduced during the uploading/downloading process of the foreground application.

After the mobile network protocol is changed in operation S404, the method 400 returns to operations S401 and S402. When the downloading of the data is completed, in other words, operation S402 determines that the foreground application does not currently communicate with the network server 200 through telecommunication connection 122, operation S412 is executed, by the processing circuitry 140, to restore the first mobile network protocol.

Figure 5:
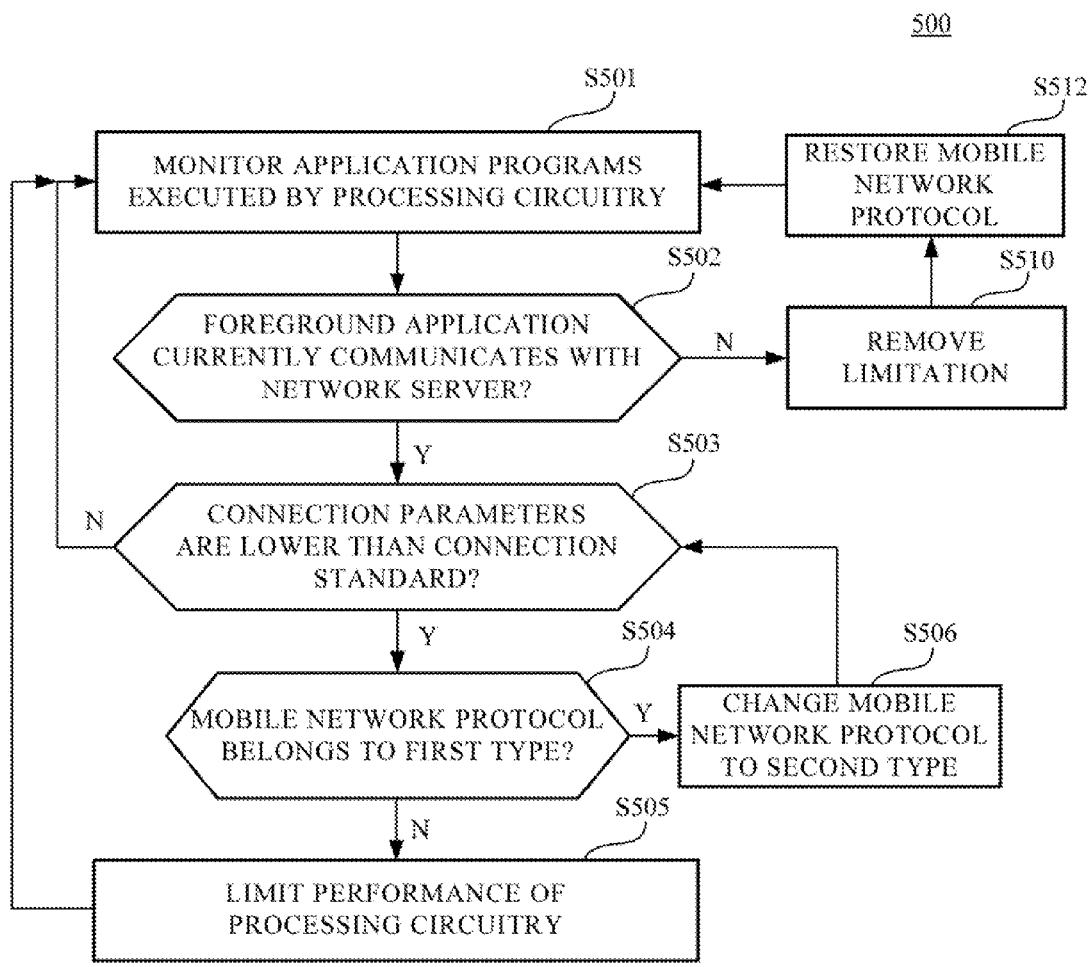
FIG. 5 is another flow diagram illustrating a control method suitable for controlling the wireless communication device in FIG. 1 or FIG. 2.

Reference is made to FIG. 5, which is another flow diagram illustrating control method 500 suitable for controlling the wireless communication device 100 in FIG. 1 or FIG. 2. As shown in FIG. 5, operation S501 is executed to monitor application programs executed by the processor 142 in FIG. 1 or the multi-core processor 143 in FIG. 2.

Operation S502 is executed, by the processor 142 in FIG. 1 or the multi-core processor 143 in FIG. 2, to determine whether the foreground application, currently communicates with the network server 200 through the telecommunication connection 122 or not. The foreground application is considered as currently communicating with the network server 200 if the foreground application is currently uploading data to the network server 200 or the downloading data from the network server 200 in FIG. 1 or FIG. 2.

In response to the foreground application currently communicating with the network server 200, operation S503 is executed, by the processor 142 in FIG. 1 or the multi-core processor 143 in FIG. 2, to check connection parameters of the telecommunication connection 122 established by the transceiver 120, and to compare the connection parameters of the telecommunication connection 122 with a connection standard (referring to Table 1).

When the connection parameters of the telecommunication connection 122 in FIG. 1 or FIG. 2 is lower than the connection standard (referring to Table 1), operation S504 is executed to check whether the mobile network protocol belongs to a first type. In some embodiments, the first type is $4^{th}$ generation (4G). If the telecommunication connection 122 is based on 4G, and operation S506 is executed to change the mobile network protocol to a second type. In some embodiments, the second type is $3^{rd}$ generation (3G).

If the mobile network protocol is not 4G, operation S505 is executed, by the processing circuitry 140, to limit the performance of the processing circuitry 140 shown in FIG. 1 or FIG. 2. The performance of the processing circuitry 140 is limited by reducing an operational frequency of the processor 142 or the GPU 144 in FIG. 1, by turning off the GPU 144 in FIG. 1, or by turning off at least processing cores C1-C8 of the multi-core processor 143 in FIG. 2.

In response to the foreground application not currently communicating with the network server 200, e.g., the uploading/downloading of data is completed, operation S510 is executed, by the processing circuitry 140, to remove the limitation to the performance to the processing circuitry 140, and operation S512 is executed, by the processing circuitry 140, to restore the telecommunication connection 122 to be established on the first mobile network protocol. The order of operations S510 and S512 are not limited to present embodiments shown in FIG. 5. In some other embodiments the order of operations S510 and S512 in FIG. 5 are alternated.

Based on the method 500, in response to the foreground application currently communicating with the network server and the connection parameters being lower than the connection standard, operation S506 is executed if the mobile network protocol belongs to 4G, and on the other hand, operation S505 is executed if the mobile network protocol belongs to 2G/3G. Operations S505 and S506 are able to reduce the power consumption of the processing circuitry 140 or the transceiver 120 on the wireless communication device 100 in FIG. 1 or FIG. 2.

Based on aforesaid embodiments, operations S304 in FIG. 3, S404 in FIG. 4 and/or S505-S506 in FIG. 5, are executed when the foreground application is uploading data to the network server 200 or downloading data from the network server 200 through the telecommunication connection 122 and also the connection parameters of the telecommunication connection 122 is lower than the connection standard. The user will hardly notice any performance difference caused by the operations S304 in FIG. 3, S404 in FIG. 4 and/or S505-S506 in FIG. 5. By applying these operations, the power consumption of the wireless communication device 100 in FIG. 1 or FIG. 2 can be reduced.

Some embodiments of the disclosure are to provide a non-transitory computer readable storage medium with a computer program to execute aforesaid control method 300/400/500 in FIGS. 3-5.

In this document, the term "coupled" may also be termed as "electrically coupled", and the term "connected" may be termed as "electrically connected". "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A wireless communication device comprising:
   a transceiver configured to establish a telecommunication connection to a network server; and
   processing circuitry coupled to the transceiver, the processing circuitry configured at least to:
   monitor application programs executed by the processing circuitry, wherein one of the application programs is executed as a foreground application;
   compare connection parameters of the telecommunication connection established by the transceiver with a connection standard; and
   in response to the foreground application currently communicating with the network server through the telecommunication connection and the connection parameters being lower than the connection standard, limit performance of the processing circuitry, wherein the processing circuitry comprises a multi-core processor, the performance of the processing circuitry is limited by turning off at least one processing core of the multi-core processor.

2. The wireless communication device of claim 1, wherein the performance of the processing circuitry is limited by reducing an operational frequency of the processing circuitry.

3. The wireless communication device of claim 1, wherein the processing circuitry comprises a processor and a graphics processing unit (GPU), the performance of the processing circuitry is limited by turning off the GPU.

4. The wireless communication device of claim 1, wherein the foreground application is considered as currently communicating with the network server if the foreground application is currently uploading data to the network server or the downloading data from the network server.

5. The wireless communication device of claim 4, wherein after the performance of the processing circuitry is limited, the processing circuitry configured to at least:
   monitor whether uploading/downloading of the data is completed; and
   in response to uploading/downloading of the data being completed, remove limitation to the performance of the processing circuitry.

6. A control method, suitable for a wireless communication device comprising a transceiver and processing circuitry, the control method comprising:
   monitor application programs executed by the processing circuitry, wherein one of the application programs is executed as a foreground application;
   comparing connection parameters of a telecommunication connection established by the transceiver with a connection standard; and
   in response to the foreground application currently communicating with a network server through the telecommunication connection and the connection parameters being lower than the connection standard, limiting performance of the processing circuitry, wherein the processing circuitry comprises a multi-core processor, the performance of the processing circuitry is limited by turning off at least one processing core of the multi-core processor.

7. The control method of claim 6, wherein, if the foreground application is currently communicating with the network server and the connection parameters are lower than the connection standard, the control method comprises:
   reducing an operational frequency of the processing circuitry to limit the performance of the processing circuitry.

8. The control method of claim 6, wherein the processing circuitry comprises a processor and a graphics processing unit (GPU), if the foreground application is currently communicating with the network server and the connection parameters are lower than the connection standard, the control method comprises:
   turning off the graphics processing unit to limit the performance of the processing circuitry.

9. The control method of claim 6, wherein the foreground application is considered as currently communicating with the network server if the foreground application is currently uploading data to the network server or the downloading data from the network server.

10. The control method of claim 9, wherein after the performance of the processing circuitry is limited, the control method further comprises:
    monitoring whether uploading/downloading of the data is completed; and
    in response to uploading/downloading of the data being completed, removing limitation to the performance of the processing circuitry.

11. A non-transitory computer readable storage medium with a computer program to execute a control method, wherein the control method comprises:
    monitor application programs executed by processing circuitry, wherein one of the application programs is executed as a foreground application;
    comparing connection parameters of the telecommunication connection established by the transceiver with a connection standard; and
    in response to one of the foreground application currently communicating with a network server through the telecommunication connection and the connection parameters being lower than the connection standard, limiting performance of the processing circuitry, wherein the processing circuitry comprises a multi-core processor, the performance of the processing circuitry is limited by turning off at least one processing core of the multi-core processor.

12. The control method of claim 11, wherein the foreground application is considered as currently communicating with the network server if the foreground application is currently uploading data to the network server or the downloading data from the network server, after the performance of the processing circuitry is limited, the control method further comprises:
  monitoring whether uploading/downloading of the data is completed; and
  in response to uploading/downloading of the data being completed, removing limitation to the performance of the processing circuitry.

\* \* \* \* \*